(12) United States Patent
Okuyama et al.

(10) Patent No.: US 8,705,916 B2
(45) Date of Patent: Apr. 22, 2014

(54) OPTICAL MODULE, OPTICAL MODULE CONNECTOR, AND OPTICAL DEFLECTION MEMBER

(75) Inventors: Takeshi Okuyama, Tokyo (JP); Tadashi Kumamoto, Tokyo (JP); Byung Hoon Jeon, Tokyo (JP); Kazuhiro Mizukami, Tokyo (JP)

(73) Assignee: Fujitsu Component Limited, Tokyo (JP)

( * ) Notice: Subject to any disclaimer, the term of this patent is extended or adjusted under 35 U.S.C. 154(b) by 73 days.

(21) Appl. No.: 13/293,630

(22) Filed: Nov. 10, 2011

(65) Prior Publication Data

US 2012/0134625 A1 May 31, 2012

(30) Foreign Application Priority Data

Nov. 30, 2010 (JP) ................................. 2010-267443

(51) Int. Cl.
*G02B 6/36* (2006.01)

(52) U.S. Cl.
USPC ............................................. 385/32; 385/89

(58) Field of Classification Search
USPC .................... 385/93, 139, 141, 135, 32, 89
See application file for complete search history.

(56) References Cited

U.S. PATENT DOCUMENTS

| | | | |
|---|---|---|---|
| 7,379,639 B2 | 5/2008 | Ozawa et al. | |
| 7,441,965 B2 * | 10/2008 | Furuno et al. | 385/93 |
| 7,457,126 B2 * | 11/2008 | Ahrens | 361/716 |
| 2008/0205894 A1 * | 8/2008 | Aoki | 398/135 |
| 2009/0016733 A1 * | 1/2009 | Hamazaki et al. | 398/139 |
| 2009/0016734 A1 * | 1/2009 | Hamazaki | 398/139 |

FOREIGN PATENT DOCUMENTS

| | | |
|---|---|---|
| JP | 2004-212847 | 7/2004 |
| JP | 2004-279620 | 10/2004 |
| JP | 2006-235115 | 9/2006 |
| JP | 2009-020280 | 1/2009 |

* cited by examiner

*Primary Examiner* — Ellen Kim
(74) *Attorney, Agent, or Firm* — IPUSA, PLLC

(57) ABSTRACT

An optical module configured to perform conversion between an optical signal and an electrical signal includes a board having a flat-plate shape; a light-receiving part and a light-emitting part attached on a surface of the board, the light-receiving part being configured to receive a first optical signal input from an optical cable and the light-emitting part being configured to output a second optical signal based on an input electrical signal; and an optical deflection member configured to deflect the first optical signal substantially 90 degrees and output the first optical signal to the light-receiving part and to deflect the second optical signal input from the light-emitting part substantially 90 degrees and output the second optical signal to the optical cable, the optical deflection member including multiple optical waveguides arranged in a first array and a second array.

9 Claims, 14 Drawing Sheets

120

120

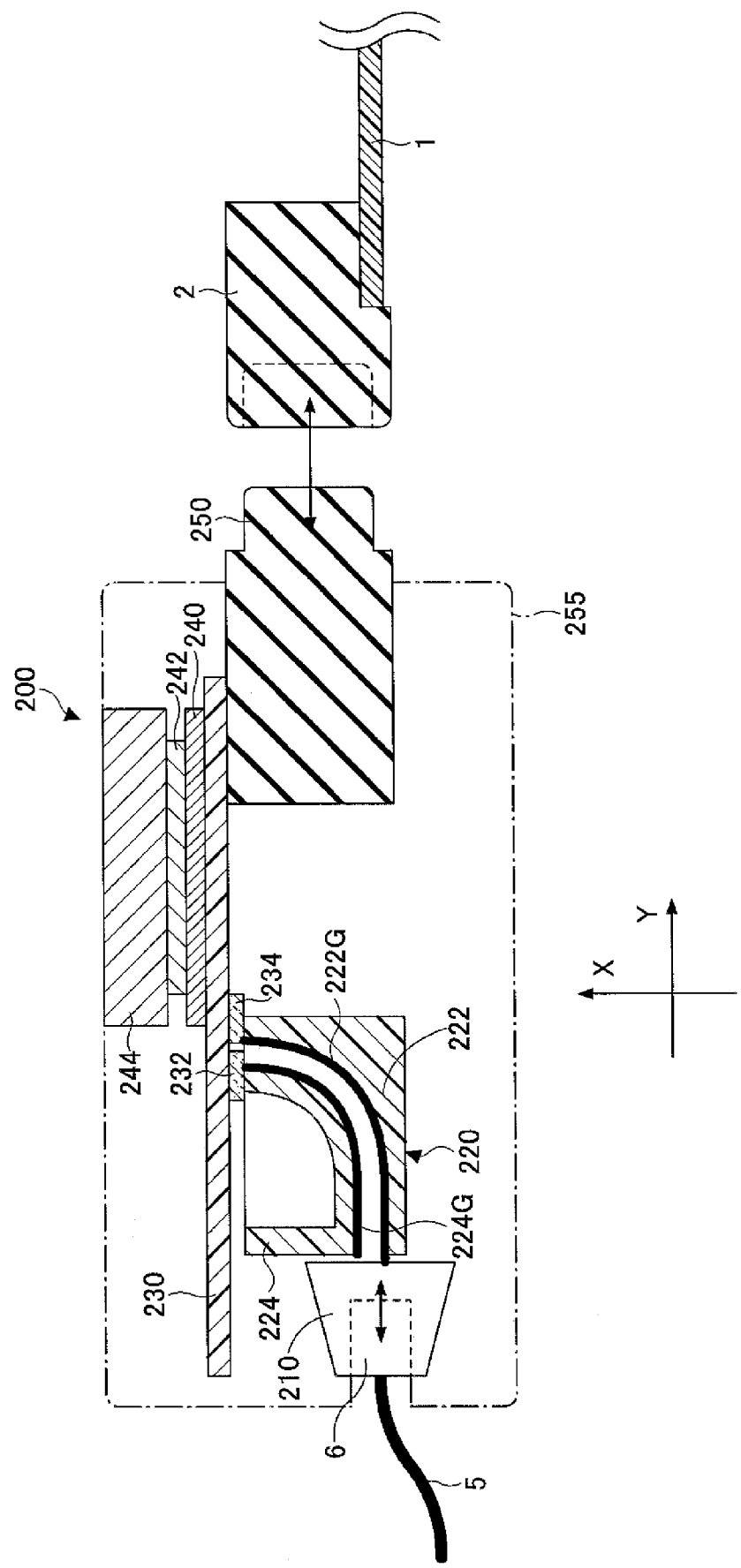

220

220

OPTICAL MODULE, OPTICAL MODULE CONNECTOR, AND OPTICAL DEFLECTION MEMBER

CROSS-REFERENCE TO RELATED APPLICATION

The present application is based upon and claims the benefit of priority of the prior Japanese Patent Application No. 2010-267443, filed on Nov. 30, 2010, the entire contents of which are incorporated herein by reference.

BACKGROUND OF THE INVENTION

1. Field of the Invention

The present invention relates to an optical module configured to convert an optical signal input from an optical cable into an electrical signal and output the electrical signal and to convert an input electrical signal into an optical signal and output the optical signal to an optical cable; an optical module connector including the optical module and a connector configured to connect the optical module to an external board; and an optical deflection member used in the optical module or the optical module connector.

2. Description of the Related Art

Conventionally, optical communication, which allows communications to be performed at higher rates than electrical communication, has been widely used. Usually, information obtained with optical communications is processed with a microcomputer or an integrated circuit (IC) formed on a board. These devices operate with electrical signals. Therefore, it is necessary to convert optical signals into electrical signals. Devices configured to convert an optical signal fed from an optical cable into an electrical signal and vice versa are referred to as "optical modules." Further, in this specification, devices having an optical module with a connector function to allow connection to an external board are referred to as "optical module connectors."

Further, conventionally, it is often the case that multiple optical waveguides are arranged in a row inside optical modules. On the other hand, recent years have seen configurations where multiple optical waveguides are arranged in two rows (arrays) as described in, for example, Japanese Laid-Open Patent Application No. 2004-279620. Japanese Laid-Open Patent Application No. 2004-279620 describes an optical integrated circuit including a flexible optical interconnect having optical waveguides stacked in two layers.

On the other hand, Japanese Laid-Open Patent Application No. 2009-020280 describes an optical transceiver (optical module) where a surface for connecting an optical cable is substantially perpendicular to the surface of a printed board on which a light-emitting device and a light-receiving device are attached.

SUMMARY OF THE INVENTION

According to an aspect of the present invention, an optical module configured to perform conversion between an optical signal and an electrical signal includes a board having a flat-plate shape; a light-receiving part and a light-emitting part attached on a surface of the board, the light-receiving part being configured to receive a first optical signal input from an optical cable and the light-emitting part being configured to output a second optical signal based on an input electrical signal; and an optical deflection member configured to deflect the first optical signal substantially 90 degrees and output the first optical signal to the light-receiving part and to deflect the second optical signal input from the light-emitting part substantially 90 degrees and output the second optical signal to the optical cable, the optical deflection member including a plurality of optical waveguides arranged in a first array and a second array.

According to an aspect of the present invention, an optical module connector includes the optical module as set forth above; and a connector configured to connect the optical module to an external board, wherein a direction in which the optical cable is introduced is substantially parallel to a plane part of the board and a plane part of the external board with the optical module connector being fit to the external board with the connector.

According to an aspect of the invention, a member for optical deflection includes an exterior member including an exterior surface curved to have a convex shape; an interior surface curved to have a concave shape; a first plane part including a first end straight line of the exterior surface and a first end straight line of the interior surface; and a second plane part including a second end straight line of the exterior surface and a second end straight line of the interior surface, the second plane part being at an angle of substantially 90 degrees to the first plane part; and an interior member including an exterior surface so curved to have a convex shape as to face the interior surface of the exterior member, wherein a first array of optical waveguides is formed along the exterior surface of the exterior member, and a second array of optical waveguides is formed along the exterior surface of the interior member, and an optical signal input at a first one of the first plane part and the second plane part of the exterior member is deflected substantially 90 degrees to be output to a second one of the first plane part and the second plane part of the exterior member.

According to an aspect of the invention, a member for optical deflection includes an exterior member including an interior surface curved to have a concave shape; a first plane part including a first end straight line of the interior surface; and a second plane part including a second end straight line of the interior surface, the second plane part being at an angle of substantially 90 degrees to the first plane part; and an interior member including an exterior surface so curved to have a convex shape as to face the interior surface of the exterior member, wherein a first array of optical waveguides is formed along the interior surface of the exterior member, and a second array of optical waveguides is formed along the exterior surface of the interior member, and an optical signal input at a first one of the first plane part and the second plane part of the exterior member is deflected substantially 90 degrees to be output to a second one of the first plane part and the second plane part of the exterior member.

According to an aspect of the invention, a member for optical deflection includes an exterior surface curved to have a convex shape; an interior surface curved to have a concave shape; a first plane part including a first end straight line of the exterior surface and an end straight line of the interior surface; and a second plane part including a second end straight line of the exterior surface, the second plane part being at an angle of substantially 90 degrees to the first plane part, wherein an array of optical waveguides is formed along each of the exterior surface and the interior surface, and a first optical signal input at the first plane part is deflected substantially 90 degrees to be output to the second plane part, and a second optical signal input at the second plane part is deflected substantially 90 degrees to be output to the first plane part.

According to an aspect of the present invention, an optical module connector is configured to convert a first optical signal input from an optical cable into a first electrical signal and output the first electrical signal to an apparatus to which the optical module connector fits, and to convert a second electrical signal input from the apparatus into a second optical signal and output the second optical signal to the optical cable, wherein a direction in which the optical cable is introduced is substantially parallel to a board of the apparatus with the optical module connector being fit to the board.

The object and advantages of the embodiments will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which:

FIG. 6 is a cross-sectional view of an optical module connector according to a second embodiment of the present invention, illustrating an overall configuration of the optical module connector;

DETAILED DESCRIPTION OF THE PREFERRED EMBODIMENTS

As described above, Japanese Laid-Open Patent Application No. 2004-279620 describes an optical integrated circuit including a flexible optical interconnect having optical waveguides stacked in two layers. This configuration, however, is prevented from achieving a desired positional relationship between an optical cable as an optical signal input/output part and an internal board or an external board to connect to.

Further, Japanese Laid-Open Patent Application No. 2009-020280 mentioned above gives no consideration to arranging multiple optical waveguides in two arrays.

Therefore, according to the conventionally disclosed configurations, it is difficult to arrange multiple optical waveguides in two arrays and also to achieve a desired positional relationship between an optical cable and an internal board or an external board to connect to.

According to an aspect of the present invention, an optical module and an optical module connector are provided that are configured to have multiple optical waveguides arranged in two arrays (in two tiers) and achieve a desired positional relationship between an optical cable to be connected and an internal board or an external board to connect to, and an optical deflection member is provided that is used in the optical module or the optical module connector.

A description is given below, with reference to the accompanying drawings, of embodiments of the present invention.
[First Embodiment]

A description is given below of an optical module connector 100 according to a first embodiment of the present invention.

Figure 1:
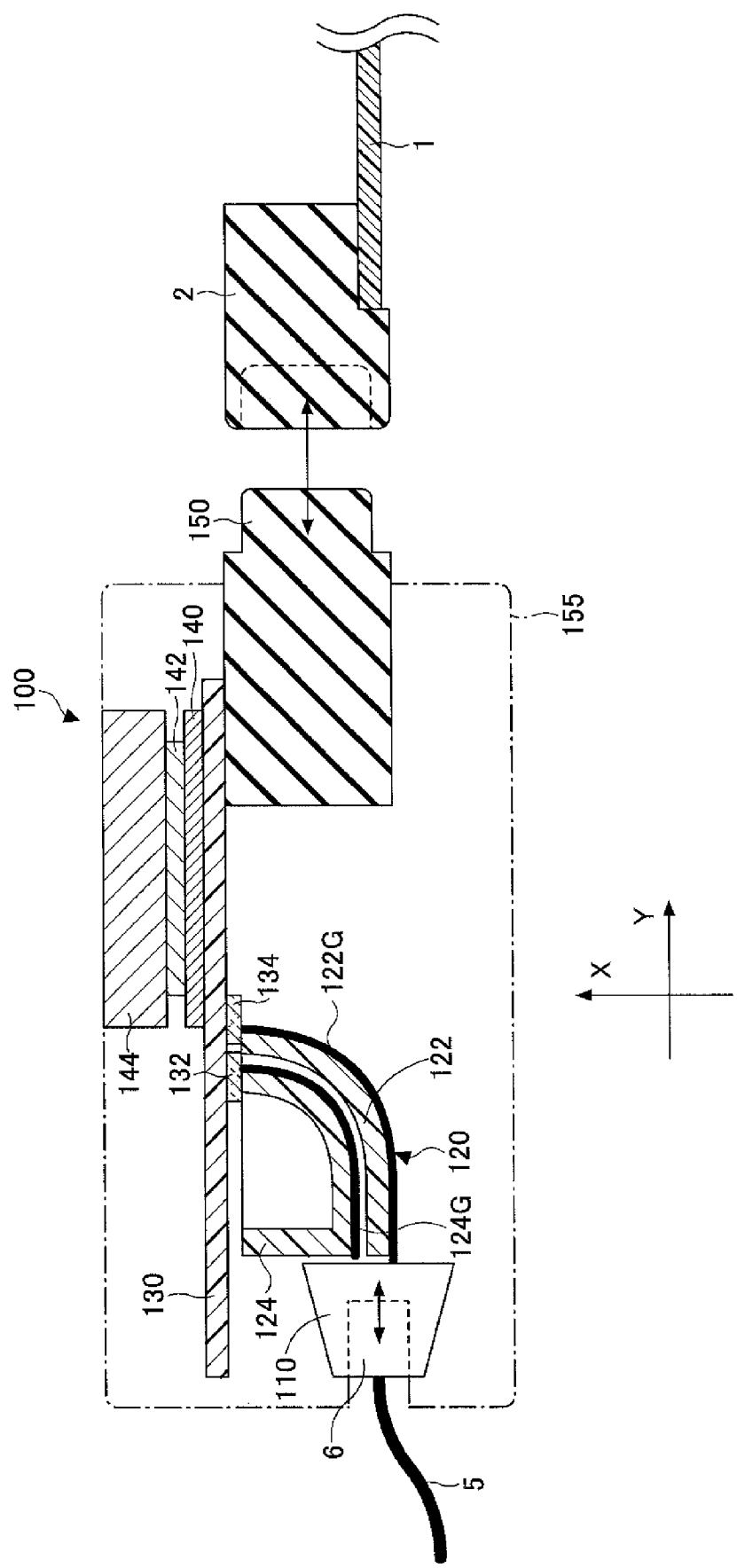
FIG. 1 is a cross-sectional view of an optical module connector according to a first embodiment of the present invention, illustrating an overall configuration of the optical module connector.

FIG. 1 is a cross-sectional view of the optical module connector 100 according to the first embodiment, illustrating an overall configuration of the optical module connector 100. The optical module connector 100 is configured to fit into a board-side right angle connector (RACN) 2 attached to an external board 1 to which the optical module connector 100 fits (connects to). The optical module connector 100 is configured to convert an optical signal fed from an optical cable 5 into an electrical signal and feed the electrical signal to the external board 1. Further, the optical module connector 100 is also configured to convert an electrical signal fed from the external board 1 into an optical signal and feed the optical signal to the optical cable 5. The fitting part of the optical module connector 100 and the external board 1 using the right angle connector 2 is not limited to the shape illustrated in FIG. 1 or any particular shape.

The optical module connector 100 includes an optical-module-side multi-fiber push-on (MPO) connector 110, an optical deflection member 120 (a member for optical deflection), an internal board 130, a light-receiving device 132, a light-emitting device 134, a driver 140, a thermally conductive sheet 142, a radiator fin 144, and an optical-module-side right angle connector 150. This configuration is accommodated in, for example, a cover member 155 indicated by a one-dot chain line in FIG. 1. A configuration where the optical-module-side right angle connector 150 is excluded from the optical module connector 100 corresponds to "optical module."

Figure 2:
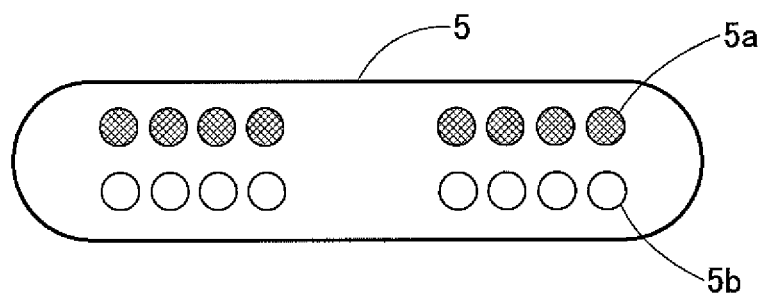
FIG. 2 is a diagram illustrating an arrangement of multiple optical waveguides in two arrays in a cross section of an optical cable according to the first embodiment.

The optical cable 5 attached to the optical module connector 100 contain multiple optical waveguides (optical fibers) arranged in two arrays (in two tiers). FIG. 2 illustrates an arrangement of multiple optical waveguides in two arrays in a cross section of the optical cable 5. In FIG. 2, optical waveguides 5a for input are arranged in an array, and optical waveguides 5b for output are arranged in an array. As graphically illustrated, according to embodiments of the present invention, "an arrangement in an array" does not necessarily mean an arrangement at regular intervals, and may include an arrangement including an irregular interval. Further, the number of optical waveguides per array is not limited in particular, and may be arbitrarily determined to be twelve, sixteen, etc. An optical-cable-side MPO connector 6 is attached at the end of the optical cable 5. The optical-cable-side MPO connector 6 is pressed and fit into the optical-module-side MPO connector 110 to allow the optical module connector 100 and the optical cable 5 to input and output optical signals.

The present invention is not limited to this, and the arrangement of multiple optical fibers contained in the optical cable 5 may be any arrangement as long as the arrangement allows optical waveguides to be arranged in two arrays (in two tiers) in the optical signal input/output part of the optical-module-side MPO connector 110 as illustrated in FIG. 2.

Next, a description is given of the optical deflection member 120.

Figure 3B:
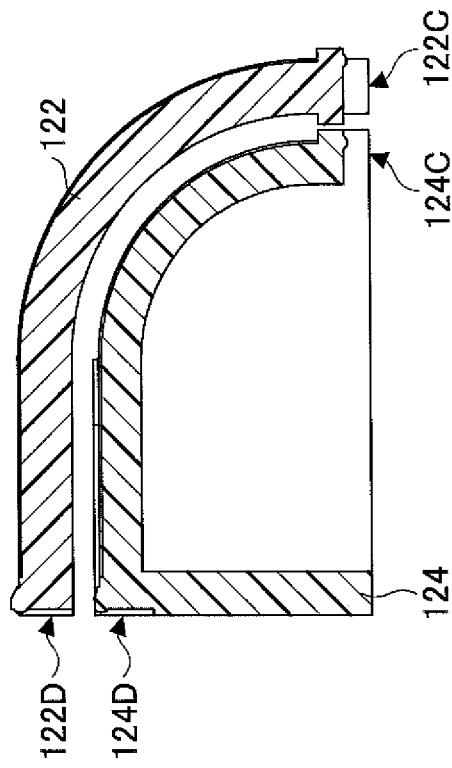
FIG. 3B is a cross-sectional view of the optical deflection member of FIG. 3A.
Figure 3A:
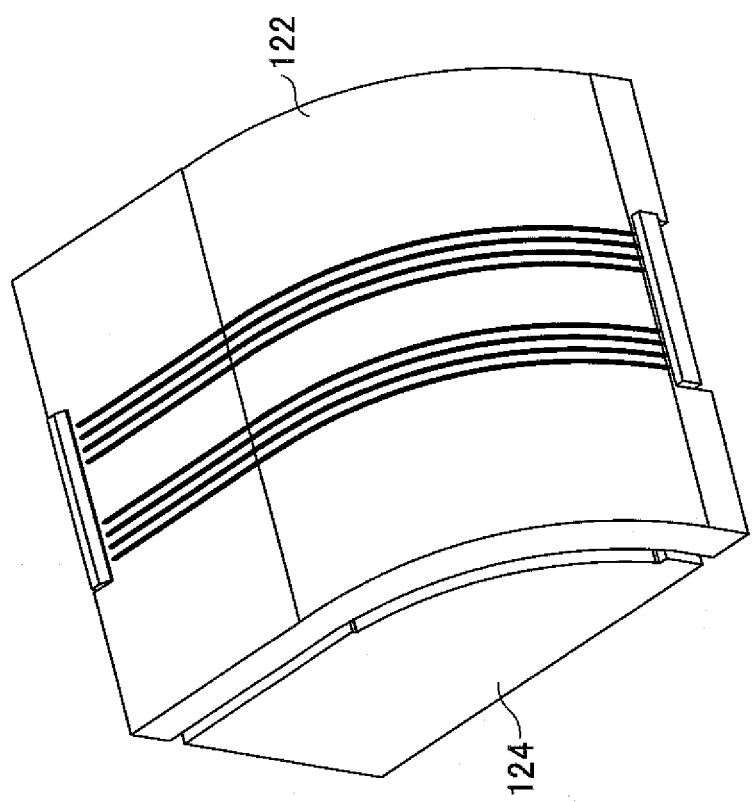
FIG. 3A is a perspective view of an optical deflection member according to the first embodiment, illustrating its exterior configuration.

FIG. 3A is a perspective view of the optical deflection member 120, illustrating its exterior configuration. FIG. 3B is a cross-sectional view of the optical deflection member 120. As graphically illustrated, the optical deflection member 120 includes an exterior member 122 and an interior member 124 joined to each other.

Figure 4B:
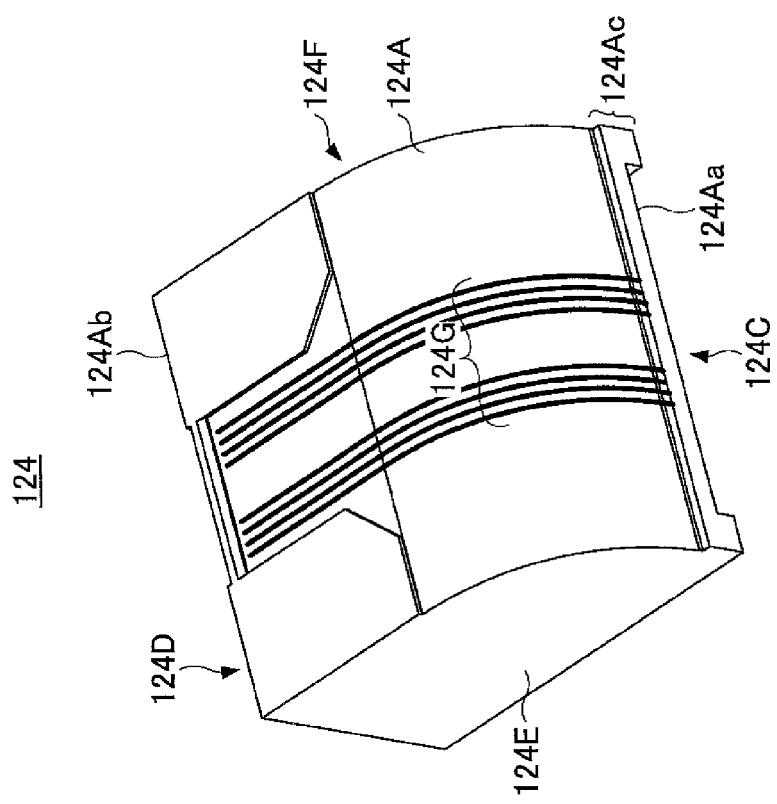
FIG. 4A and FIG. 4B are perspective views of an exterior member and an interior member, respectively, of the optical deflection member according to the first embodiment, illustrating their respective exterior configurations.
Figure 4A:
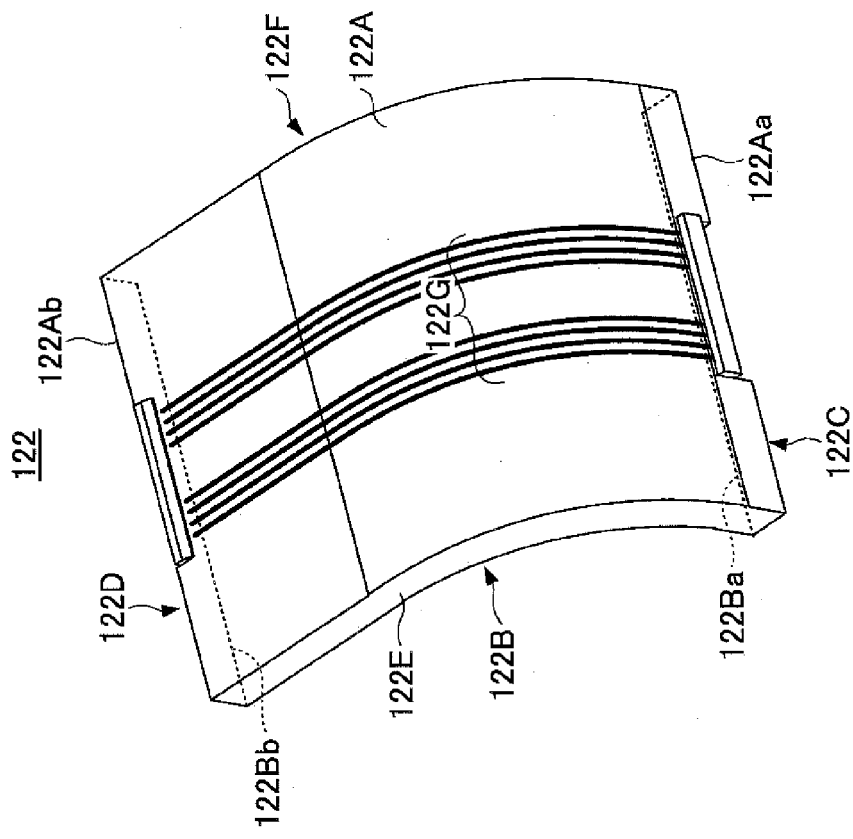

FIG. 4A and FIG. 4B are perspective views of the exterior member 122 and the interior member 124, respectively, illustrating their respective exterior configurations. The exterior member 122 and the interior member 124 are formed of, for example, an olefin resin.

The exterior member 122 includes an exterior surface 122A that curves (outward) to have a convex shape; an interior surface 122B that curves (inward) to have a concave shape; a first plane part (a bottom surface part) 122C including a first end straight line 122Aa of the exterior surface 122A and a first end straight line 122Ba of the interior surface 122B; a second plane part (a rear surface part) 122D including a second end straight line 122Ab of the exterior surface 122A and a second end straight line 122Bb of the interior surface 122B; and side surfaces 122E and 122F.

The exterior surface 122A and the interior surface 122B of the exterior member 122 have a shape of, for example, a combination of a plane and a side (circumferential) surface of a cylinder. The first plane part 122C and the second plane part 122D form an angle of substantially 90 degrees.

Further, the exterior surface 122A and the interior surface 122B of the exterior member 122 are formed so that their respective cross sections have a shape of, for example, a succession of a straight line and an arc. However, the cross-sectional shape of the exterior surface 122A and the interior surface 122B is not limited to this, and may be any shape as long as the shape is so smooth as to not prevent passage of optical signals. For example, the cross-sectional shape of the exterior surface 122A and the interior surface 122B may be any shape formed of a straight line, a parabola, an ellipse, a hyperbola, or any combination of them.

An array of optical waveguides (an optical waveguide array) 122G is formed on the exterior surface 122A of the exterior member 122. (Referring to FIG. 4A, eight optical waveguides are arranged in an array as the optical waveguide array 122G.) The optical waveguides are formed by, for example, filling grooves formed on the exterior surface 122A with a desired core material having a light transmission characteristic and stacking a desired resin coating layer on the core layer to cover the core layer.

The interior member 124 includes an exterior surface 124A that curves (outward) to have a convex shape to face the interior surface 1225 of the exterior member 122; a first plane part (a bottom surface part) 124C including a first end straight line 124Aa of the exterior surface 124A; a second plane part (a rear surface part) 124D including a second end straight line 124Ab of the exterior surface 124A; and side surfaces 124E and 124F.

The first plane part 124C of the interior member 124 is positioned in substantially the same plane as the first plane part 122C of the exterior member 122 with the exterior member 122 and the interior member 124 being combined with an adhesive agent or the like. Likewise, the second plane part 124D of the interior member 124 is positioned in substantially the same plane as the second plane part 122D of the exterior member 122 with the exterior member 122 and the interior member 124 being combined with an adhesive agent or the like. (See FIG. 3B.)

Like the exterior surface 122A of the exterior member 122, the exterior surface 124A of the interior member 124 may be defined by a straight line, an arc, etc. The exterior surface 124A of the interior member 124 may include a stepped portion 124Ac as illustrated in FIG. 4B. The same applies to the exterior surface 122A of the exterior member 122. The "exterior surface" and the "interior surface" according to embodiments of the present invention may include a slightly stepped portion.

An array of optical waveguides (an optical waveguide array) 124G is formed on the exterior surface 124A of the interior member 124. (Referring to FIG. 4B, eight optical waveguides are arranged in an array as the optical waveguide array 124G.) Like in the case of the exterior member 122, the optical waveguides are formed by, for example, filling grooves formed on the exterior surface 124A with a desired core material having a light transmission characteristic and stacking a desired resin coating layer on the core layer to cover the core layer. If the exterior surface (122A or 124A) includes a stepped portion, optical waveguides may be formed by filling through holes with a core material in the stepped portion.

The optical deflection member 120 is attached to the internal board 130 using an adhesive agent, screws or the like so that the first plane part 1220 of the exterior member 122 and the first plane part 124C of the interior member 124 face the light-receiving device 132 and the light-emitting device 134. For example, the optical deflection member 120 is attached to the internal board 130 at a position where the first plane part 122C of the exterior member 122 (or the optical waveguide array 122G) faces the light-emitting device 134 and the first plane part 124C of the interior member 124 (or the optical waveguide array 124G) faces the light-receiving device 132. A lens for improving the characteristics of the optical system may be provided between the optical deflection member 120 and the light-receiving device 132 and/or the light-emitting device 134.

Further, the optical-module-side MPO connector 110 is attached to the optical deflection member 120 so that the second plane part 122D of the exterior member 122 and the second plane part 124D of the interior member 124 face the optical-module-side MPO connector 110.

This configuration allows the optical deflection member 120 to deflect an optical signal input from the optical cable 5 substantially 90 degrees and then output the optical signal to the light-receiving device 132, and to deflect an optical signal input from the light-emitting device 134 substantially 90 degrees and then output the optical signal to the optical cable 5.

Further, the optical deflection member 120 has an array of optical waveguides formed on each of the exterior surface 122A of the exterior member 122 and the exterior surface 124A of the interior member 124. Therefore, with the exterior member 122 and the interior member 124 combined, the optical deflection member 120 has multiple optical waveguides arranged in two arrays (in two tiers). Accordingly, an arrangement of optical waveguides in a cross section of the optical deflection member 120 and an arrangement of the end portions of optical waveguides in the second plane parts 122D and 124D are as illustrated in FIG. 2.

Figure 5:
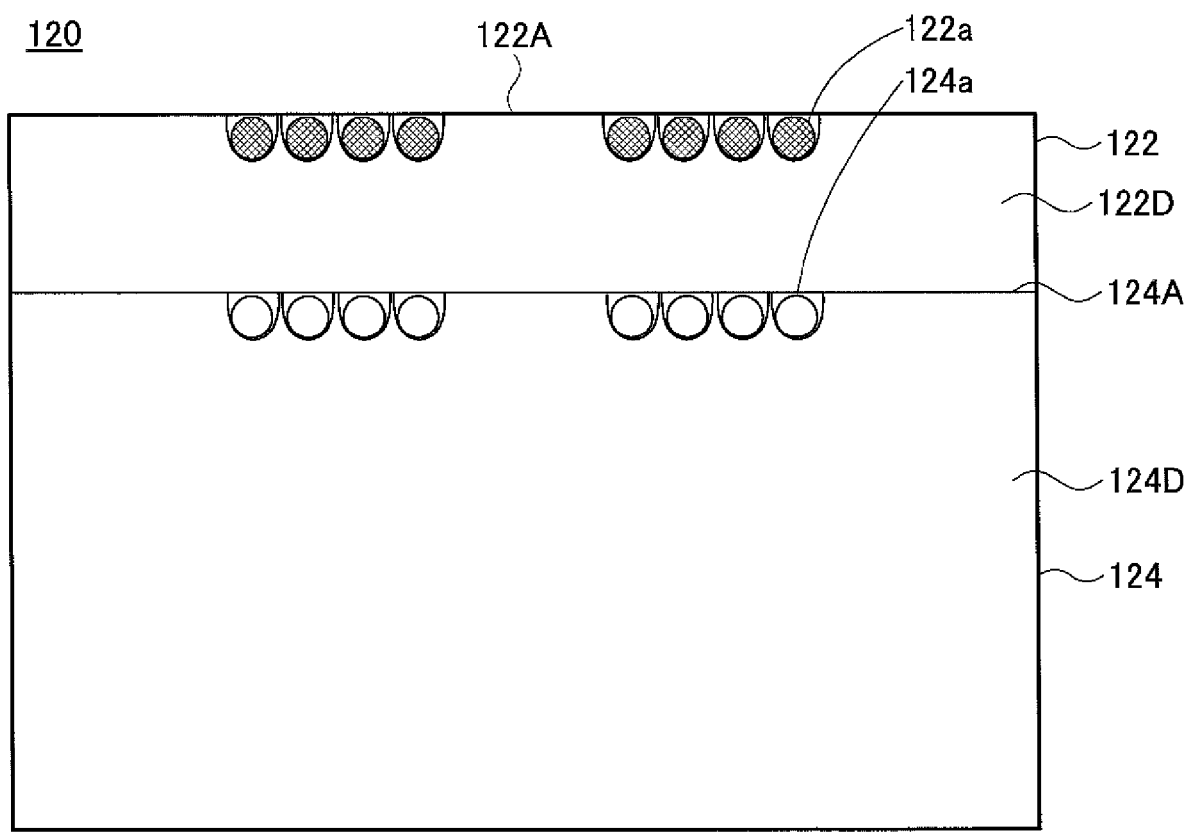
FIG. 5 is a side view of the optical deflection member taken from the side of a second plane part of the exterior member and a second plane part of the interior member with the exterior member and the interior member being combined according to the first embodiment.

FIG. 5 is a side view of the optical deflection member 120 (in an assembled state) taken from the side of the second plane part 122D of the exterior member 122 and the second plane part 124D of the interior member 124 with the exterior member 122 and the interior member 124 being combined. As illustrated in FIG. 5, optical waveguides 122a (for output) are arranged in an array on the exterior surface 122A of the exterior member 122 (to form the optical waveguide array 122G), and optical waveguides 124a (for input) are arranged in an array on the exterior surface 124A of the interior member 124 (to form the optical waveguide array 124G). This makes it possible to adapt to an MPO connector having multiple optical signal input/output parts arranged in two arrays, not to mention an optical fiber containing multiple optical waveguides (optical fibers) arranged in two arrays.

In manufacturing the optical deflection member 120 according to this embodiment, all the processes of forming grooves, filling the grooves with a core material, and stacking a resin coating layer are performed on the exterior surfaces 122A and 124A that curve to have a convex shape. On the other hand, according to a second embodiment and a third embodiment to be described below, the same processes are performed on an interior surface that curves to have a concave shape. These processes are more easily performed on the exterior surface (because cracks are less likely to occur, the amount of filling is more likely to be uniform, etc.) than on the interior surface. Accordingly, the optical deflection member 120 of the first embodiment may be manufactured more easily than those of the second embodiment and the third embodiment.

The internal board 130 is, for example, a flat-plate board having copper interconnects or the like formed on a glass epoxy resin substrate. The light-receiving device 132 and the light-emitting device 134 are attached on one side of the internal board 130, and the driver 140, the thermally conductive sheet 142, and the radiator fin 144 are stacked in layers on the other side of the internal board 130. The driver 140 and the light-emitting device 134 are connected by forming vias and connecting the light-emitting device 134 and pads provided around the lead-out parts of the vias by wire bonding. This makes it possible to dispose elements with efficiency without an excessive increase in the size of the internal board 130.

The light-receiving device 132, which is a photoelectric conversion element, is configured to convert an optical signal input from the optical fiber 5 through the MPO connectors 6 and 110 and the optical deflection member 120 into an electrical signal and to output the electrical signal. The electrical signal output by the light-receiving device 132 is output to the external board 1 via the right angle connector 2.

The driver 140 is configured to cause an electrical signal input from the external board 1 via the right angle connector 2 to be converted into an optical signal and output by the light-emitting device 134. Further, the driver 140 may also be configured to perform processing such as amplification and filtering on the electrical signal output by the light-receiving device 132.

This configuration allows an optical signal input from the optical cable 5 to be converted into an electrical signal and output to the external board 1 and allows an electrical signal input from the external board 1 to be converted into an optical signal and output to the optical cable 5.

Further, a direction in which the optical cable 5 is introduced is substantially parallel to the plane part (flat surface) of the internal board 130 on which the light-receiving device 132 and the light-emitting device 134 are attached, and the internal board 130 and the external board 1 are connected with the right angle connector 2 as illustrated in FIG. 1. Accordingly, it is possible to make the introduction direction of the optical cable 5 substantially parallel to the plane part of the external board 1. (These are along the Y-axis directions in FIG. 1.)

This allows the optical module connector 100 to be inserted, at the end of the external board 1, from a direction parallel to the plane part of the external board 1, so that the direction of cable connection is preferable. For example, it is assumed that the external board 1 is part of a microcomputer. Usually, connection terminals in desktop personal computers or notebook personal computers are so designed as to allow a cable to be connected to a housing having a flat-plate shape from a direction parallel to the plane part of the housing. The optical module connector 100 of this embodiment is suitably adaptable to such a form of connection.

It is possible for the above-described optical deflection member 120 according to this embodiment to deflect an optical signal input from the optical cable 5 substantially 90 degrees and output the optical signal to the light-receiving device 132 and to deflect an optical signal input from the light-emitting device 134 substantially 90 degrees and output the optical signal to the optical cable 5 while having multiple optical waveguides arranged in two arrays (in two tiers).

Further, according to the optical module connector 100 of this embodiment and an optical module that forms part of the optical module connector 100, use of the optical deflection member 120 makes it possible to achieve a desired positional relationship between the optical cable 5 and the internal board 130 and the external board 1 (the introduction direction of the optical cable 5 and the plane parts of the internal board 130 and the external board 1 being substantially parallel) while having a structure where multiple optical waveguides are arranged in two arrays (in two tiers).

[Second Embodiment]

Next, a description is given of an optical module connector 200 according to the second embodiment of the present invention.

FIG. 6 is a cross-sectional view of the optical module connector 200 according to the second embodiment, illustrating an overall configuration of the optical module connector 200. The optical module connector 200 is configured to fit into the board-side right angle connector 2 attached to the external board 1 to which the optical module connector 200 fits (connects to). The optical module connector 200 is configured to convert an optical signal fed from the optical cable 5 into an electrical signal and feed the electrical signal to the external board 1. Further, the optical module connector 200 is also configured to convert an electrical signal fed from the external board 1 into an optical signal and feed the optical signal to the optical cable 5. The fitting part of the optical module connector 200 and the external board 1 using the right angle connector 2 is not limited to the shape illustrated in FIG. 6 or any particular shape.

The optical module connector 200 includes an optical-module-side multi-fiber push-on (MPO) connector 210, an optical deflection member 220 (a member for optical deflection), an internal board 230, a light-receiving device 232, a light-emitting device 234, a driver 240, a thermally conductive sheet 242, a radiator fin 244, and an optical-module-side right angle connector 250. This configuration is accommodated in, for example, a cover member 255 indicated by a one-dot chain line in FIG. 6. A configuration where the optical-module-side right angle connector 250 is excluded from the optical module connector 200 corresponds to "optical module."

The above-described elements of the optical module connector 200 except the optical deflection member 220 have the same functions and configurations as the corresponding elements (referred to by reference numerals having the same last two digits as the elements of the optical module connector 200) of the optical module connector 100 of the first embodiment.

A description is given of the optical deflection member 220.

Figure 7B:
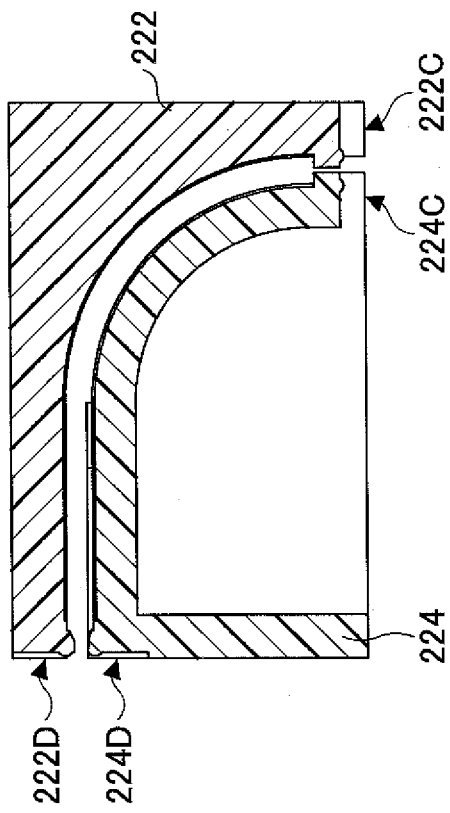
FIG. 7B is a cross-sectional view of the optical deflection member of FIG. 7A.
Figure 7A:
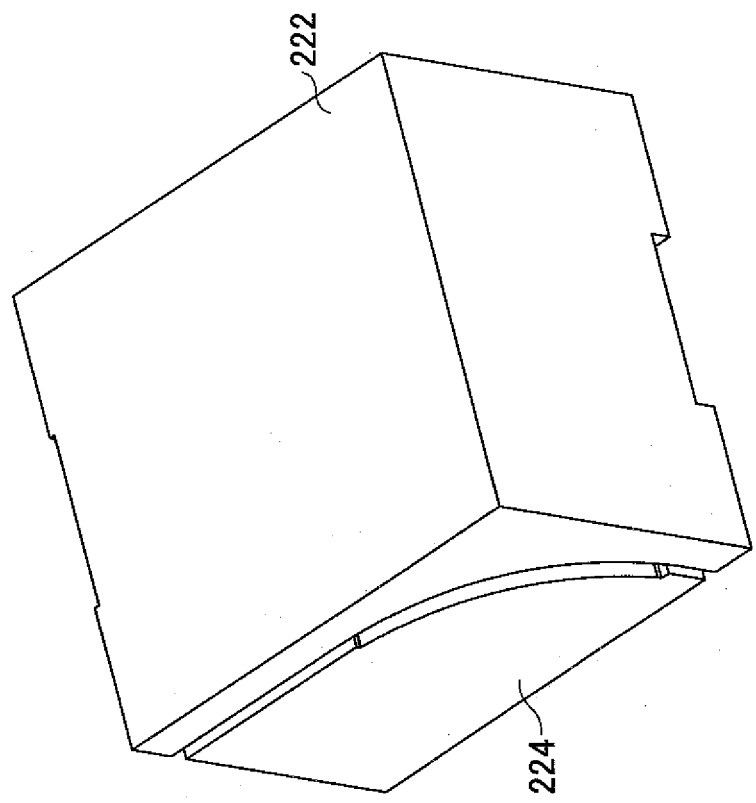
FIG. 7A is a perspective view of an optical deflection member according to the second embodiment, illustrating its exterior configuration.

FIG. 7A is a perspective view of the optical deflection member 220, illustrating its exterior configuration. FIG. 7B is a cross-sectional view of the optical deflection member 220. As graphically illustrated, the optical deflection member 220 includes an exterior member 222 and an interior member 224 joined to each other.

Figure 8B:
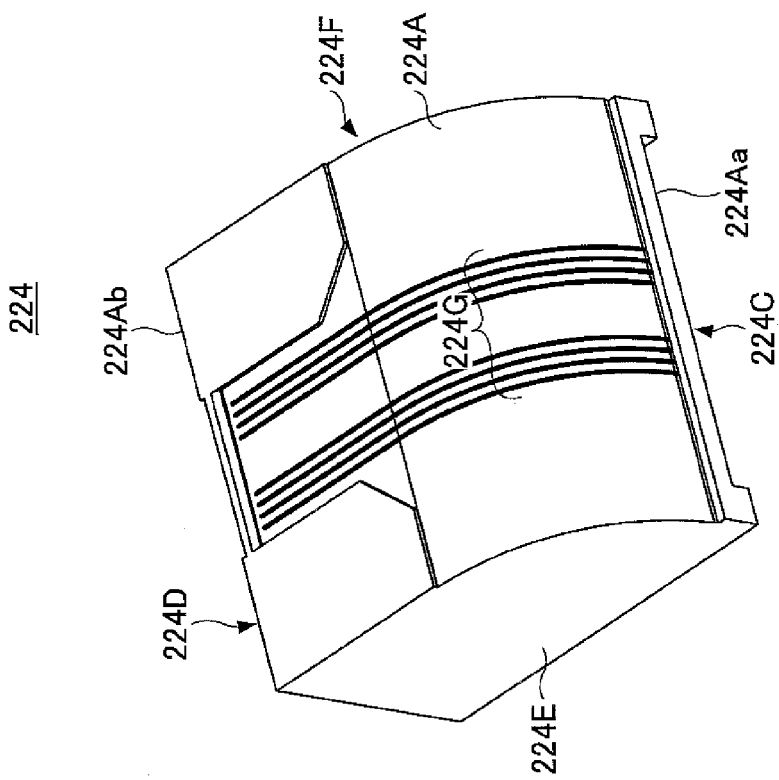
FIGS. 8A and 8B are perspective views of an exterior member and an interior member, respectively, of the optical deflection member according to the second embodiment, illustrating their respective exterior configurations.
Figure 8A:
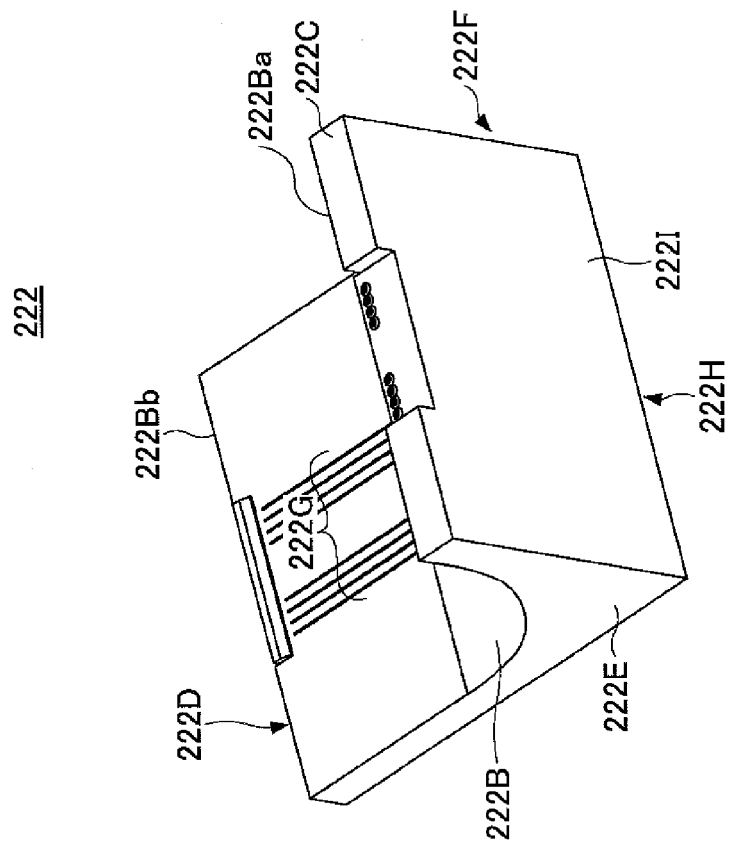

FIGS. 8A and 8B are perspective views of the exterior member 222 and the interior member 224, respectively, illustrating their respective exterior configurations. The exterior member 222 and the interior member 224 are formed of, for example, an olefin resin.

The exterior member 222 includes an interior surface 222B that curves (inward) to have a concave shape; a first plane part (a bottom surface part) 222C including a first end straight line 222Ba of the interior surface 222B; a second plane part (a rear surface part) 222D including a second end straight line 222Bb of the interior surface 222B; side surfaces 222E and 222F; a top plate surface 222H, and a front face 222I.

The interior surface 222B of the exterior member 222 has a shape of, for example, a combination of a plane and a side (circumferential) surface of a cylinder. The first plane part 222C and the second plane part 222D form an angle of substantially 90 degrees.

Further, the interior surface 222B of the exterior member 222 is formed so that its cross section has a shape of, for example, a succession of a straight line and an arc. However, the cross-sectional shape of the interior surface 222B is not limited to this, and may be any shape as long as the shape is so smooth as to not prevent passage of optical signals. For example, the cross-sectional shape of the interior surface 222B may be any shape formed of a straight line, a parabola, an ellipse, a hyperbola, or any combination of them.

An array of optical waveguides (an optical waveguide array) 222G is formed on the interior surface 222B of the exterior member 222. (Referring to FIG. 8A, eight optical waveguides are arranged in an array as the optical waveguide array 222G.) The optical waveguides are formed by, for example, filling grooves formed on the interior surface 222B with a desired core material having a light transmission characteristic and stacking a desired resin coating layer on the core layer to cover the core layer.

The interior member 224 includes an exterior surface 224A that curves (outward) to have a convex shape to face the interior surface 222B of the exterior member 222; a first plane part (a bottom surface part) 224C including a first end straight line 224Aa of the exterior surface 224A; a second plane part (a rear surface part) 224D including a second end straight line 224Ab of the exterior surface 224A; and side surfaces 224E and 224F.

The first plane part 224C of the interior member 224 is positioned in substantially the same plane as the first plane part 222C of the exterior member 222 with the exterior member 222 and the interior member 224 being combined with an adhesive agent or the like. Likewise, the second plane part 224D of the interior member 224 is positioned in substantially the same plane as the second plane part 222D of the exterior member 222 with the exterior member 222 and the interior member 224 being combined with an adhesive agent or the like. (See FIG. 7B.)

Like the interior surface 222B of the exterior member 222, the exterior surface 224A of the interior member 224 may be defined by a straight line, an arc, etc.

An array of optical waveguides (an optical waveguide array) 224G is formed on the exterior surface 224A of the interior member 224. (Referring to FIG. 8B, eight optical waveguides are arranged in an array as the optical waveguide array 224G.) Like in the case of the exterior member 222, the optical waveguides are formed by, for example, filling grooves formed on the exterior surface 224A with a desired core material having a light transmission characteristic and stacking a desired resin coating layer on the core layer to cover the core layer.

The optical deflection member 220 is attached to the internal board 230 using an adhesive agent, screws or the like so that the first plane part 222C of the exterior member 222 and the first plane part 224C of the interior member 224 face the light-receiving device 232 and the light-emitting device 234. For example, the optical deflection member 220 is attached to the internal board 230 at a position where the first plane part 222C of the exterior member 222 (or the optical waveguide array 222G) faces the light-emitting device 234 and the first plane part 224C of the interior member 224 (or the optical waveguide array 224G) faces the light-receiving device 232. A lens for improving the characteristics of the optical system may be provided between the optical deflection member 220 and the light-receiving device 232 and/or the light-emitting device 234.

Further, the optical-module-side MPO connector 210 is attached to the optical deflection member 220 so that the second plane part 222D of the exterior member 222 and the second plane part 224D of the interior member 224 face the optical-module-side MPO connector 210.

This configuration allows the optical deflection member 220 to deflect an optical signal input from the optical cable 5 substantially 90 degrees and then output the optical signal to the light-receiving device 232, and to deflect an optical signal input from the light-emitting device 234 substantially 90 degrees and then output the optical signal to the optical cable 5.

Further, the optical deflection member 220 has an array of optical waveguides formed on each of the interior surface 222B of the exterior member 222 and the exterior surface 224A of the interior member 224. Therefore, with the exterior member 222 and the interior member 224 combined, the optical deflection member 220 has multiple optical waveguides arranged in two arrays (in two tiers). Accordingly, an arrangement of optical waveguides in a cross section of the optical deflection member 220 and an arrangement of the end portions of optical waveguides in the second plane parts 222D and 224D are as illustrated in FIG. 2.

Figure 9:
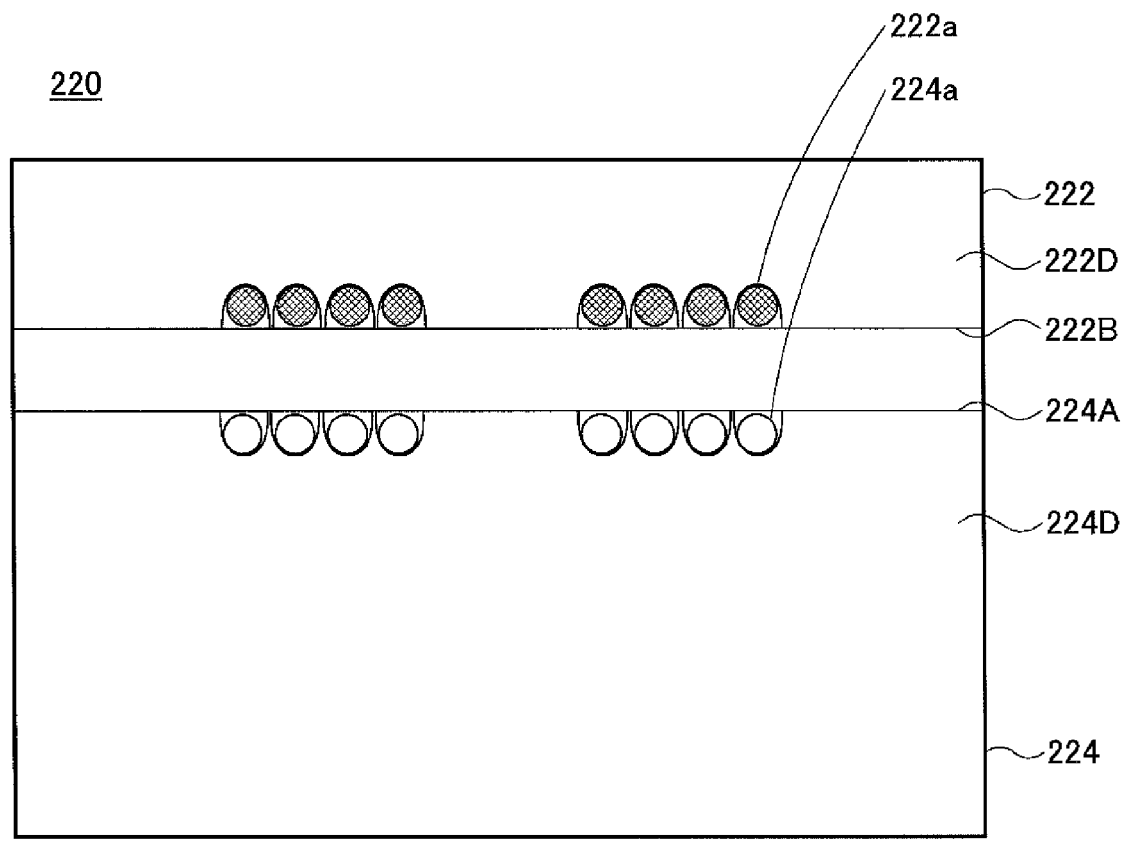
FIG. 9 is a side view of the optical deflection member taken from the side of a second plane part of the exterior member and a second plane part of the interior member with the exterior member and the interior member being combined according to the second embodiment.

FIG. 9 is a side view of the optical deflection member 220 (in an assembled state) taken from the side of the second plane part 222D of the exterior member 222 and the second plane part 224D of the interior member 224 with the exterior member 222 and the interior member 224 being combined. As illustrated in FIG. 9, optical waveguides 222a (for output) are arranged in an array on the interior surface 222B of the exterior member 222 (to form the optical waveguide array 222G), and optical waveguides 224a (for input) are arranged in an array on the exterior surface 224A of the interior member 224 (to form the optical waveguide array 224G). This makes it possible to adapt to an MPO connector having multiple optical signal input/output parts arranged in two arrays, not to mention an optical fiber containing multiple optical waveguides (optical fibers) arranged in two arrays.

The internal board 230 is, for example, a flat-plate board having copper interconnects or the like formed on a glass epoxy resin substrate. The light-receiving device 232 and the light-emitting device 234 are attached on one side of the internal board 230, and the driver 240, the thermally conductive sheet 242, and the radiator fin 244 are stacked in layers on the other side of the internal board 230. The driver 240 and the light-emitting device 234 are connected by forming vias and connecting the light-emitting device 234 and pads provided around the lead-out parts of the vies by wire bonding. This makes it possible to dispose elements with efficiency without an excessive increase in the size of the internal board 230.

The light-receiving device 232, which is a photoelectric conversion element, is configured to convert an optical signal input from the optical fiber 5 through the MPO connectors 6 and 210 and the optical deflection member 220 into an electrical signal and to output the electrical signal. The electrical signal output by the light-receiving device 232 is output to the external board 1 via the right angle connector 2.

The driver 240 is configured to cause an electrical signal input from the external board 1 via the right angle connector 2 to be converted into an optical signal and output by the light-emitting device 234. Further, the driver 240 may also be configured to perform processing such as amplification and filtering on the electrical signal output by the light-receiving device 232.

This configuration allows an optical signal input from the optical cable 5 to be converted into an electrical signal and output to the external board 1 and allows an electrical signal input from the external board 1 to be converted into an optical signal and output to the optical cable 5.

Further, a direction in which the optical cable 5 is introduced is substantially parallel to the plane part (flat surface) of the internal board 230 on which the light-receiving device 232 and the light-emitting device 234 are attached, and the internal board 230 and the external board 1 are connected with the right angle connector 2 as illustrated in FIG. 6. Accordingly, it is possible to make the introduction direction of the optical cable 5 substantially parallel to the plane part of the external board 1. (These are along the Y-axis directions in FIG. 6.)

This allows the optical module connector 200 to be inserted, at the end of the external board 1, from a direction parallel to the plane part of the external board 1, so that the direction of cable connection is preferable. For example, it is assumed that the external board 1 is part of a microcomputer. Usually, connection terminals in desktop personal computers or notebook personal computers are so designed as to allow a cable to be connected to a housing having a flat-plate shape from a direction parallel to the plane part of the housing. The optical module connector 200 of this embodiment is suitably adaptable to such a form of connection.

It is possible for the above-described optical deflection member 220 according to this embodiment to deflect an optical signal input from the optical cable 5 substantially 90 degrees and output the optical signal to the light-receiving device 232 and to deflect an optical signal input from the light-emitting device 234 substantially 90 degrees and output the optical signal to the optical cable 5 while having multiple optical waveguides arranged in two arrays (in two tiers).

Further, according to the optical module connector 200 of this embodiment and an optical module that forms part of the optical module connector 200, use of the optical deflection member 220 makes it possible to achieve a desired positional relationship between the optical cable 5 and the internal board 230 and the external board 1 (the introduction direction of the optical cable 5 and the plane parts of the internal board 230 and the external board 1 being substantially parallel) while having a structure where multiple optical waveguides are arranged in two arrays (in two tiers).

[Third Embodiment]

Next, a description is given of an optical module connector 300 according to the third embodiment of the present invention.

Figure 10:
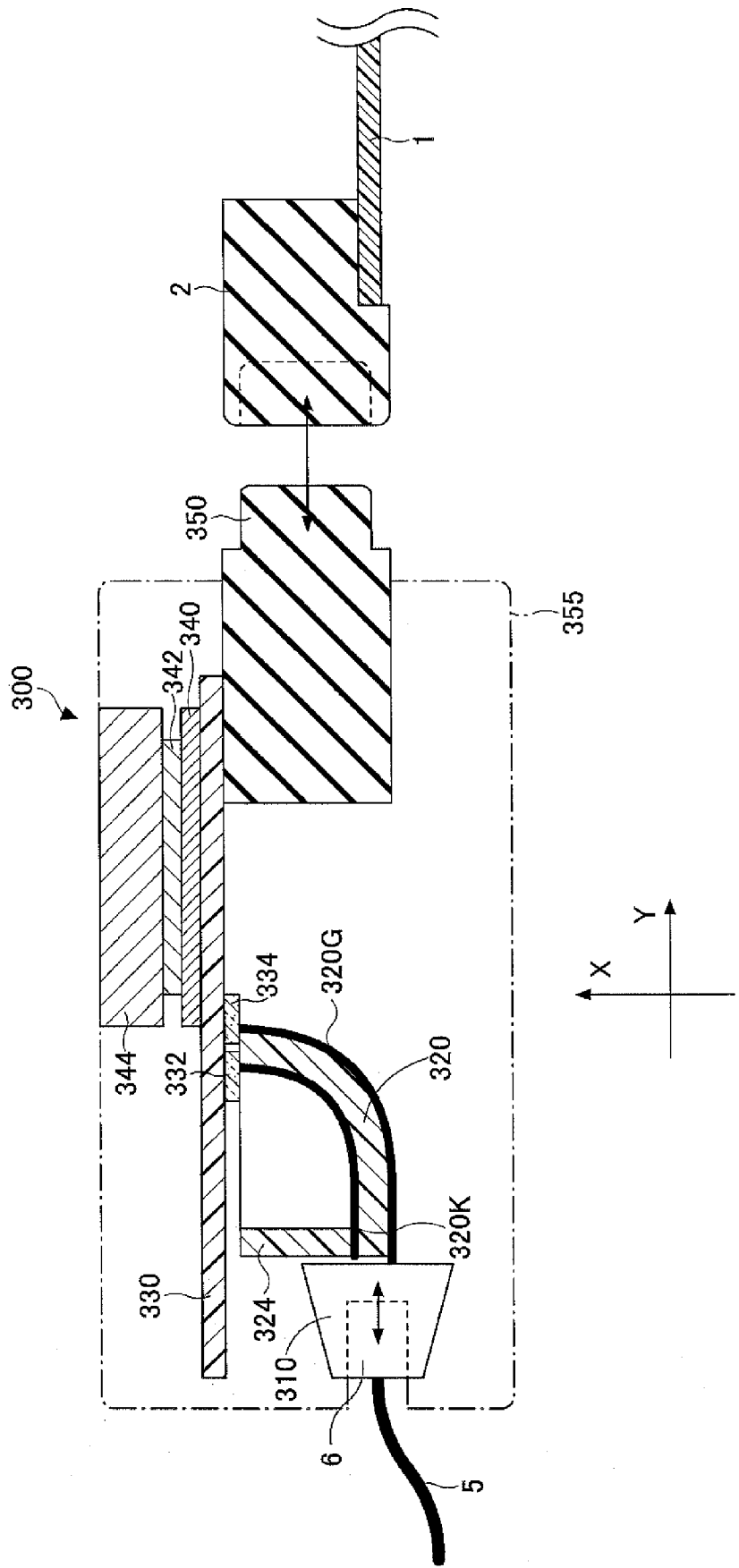
FIG. 10 is a cross-sectional view of an optical module connector according to a third embodiment of the present invention, illustrating an overall configuration of the optical module connector.

FIG. 10 is a cross-sectional view of the optical module connector 300 according to the third embodiment, illustrating an overall configuration of the optical module connector 300. The optical module connector 300 is configured to fit into the board-side right angle connector 2 attached to the external board 1 to which the optical module connector 300 fits (connects to). The optical module connector 300 is configured to convert an optical signal fed from the optical cable 5 into an electrical signal and feed the electrical signal to the external board 1. Further, the optical module connector 300 is also configured to convert an electrical signal fed from the external board 1 into an optical signal and feed the optical signal to the optical cable 5. The fitting part of the optical module connector 300 and the external board 1 using the right angle connector 2 is not limited to the shape illustrated in FIG. 10 or any particular shape.

The optical module connector 300 includes an optical-module-side multi-fiber push-on (MPO) connector 310, an optical deflection member 320 (a member for optical deflection), an internal board 330, a light-receiving device 332, a light-emitting device 334, a driver 340, a thermally conductive sheet 342, a radiator fin 344, and an optical-module-side right angle connector 350. This configuration is accommodated in, for example, a cover member 355 indicated by a one-dot chain line in FIG. 10. A configuration where the optical-module-side right angle connector 350 is excluded from the optical module connector 300 corresponds to "optical module."

The above-described elements of the optical module connector 300 except the optical deflection member 320 have the same functions and configurations as the corresponding elements (referred to by reference numerals having the same last two digits as the elements of the optical module connector 300) of the optical module connector 100 of the first embodiment.

A description is given of the optical deflection member 320.

Figure 11B:
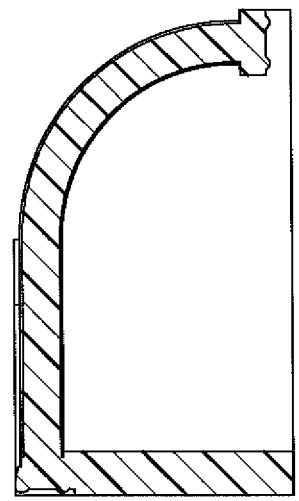
FIG. 11B is a cross-sectional view of the optical deflection member of FIG. 11A.
Figure 11A:
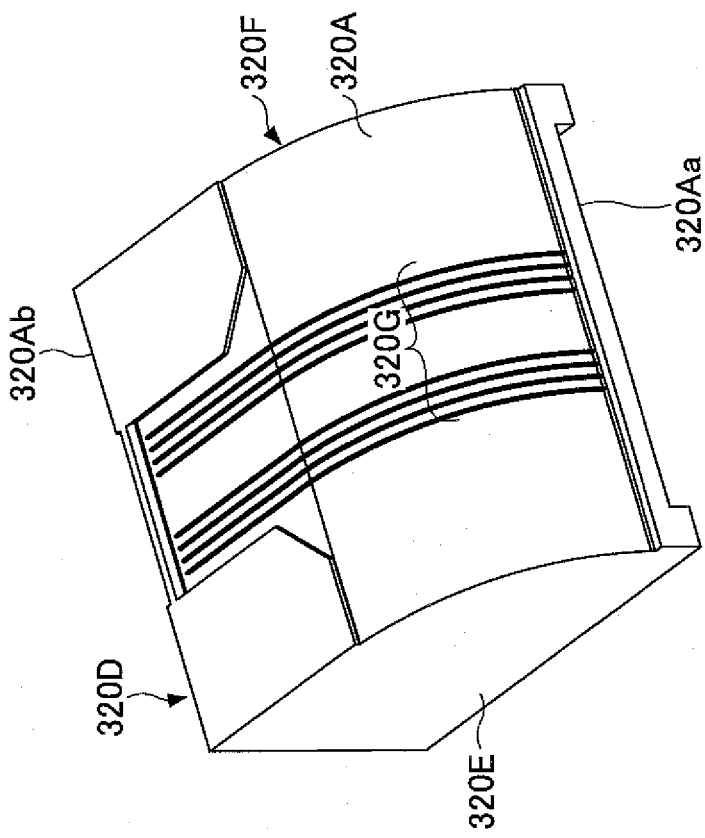
FIG. 11A is a perspective view of an optical deflection member according to the third embodiment, illustrating its exterior configuration.
Figure 12:
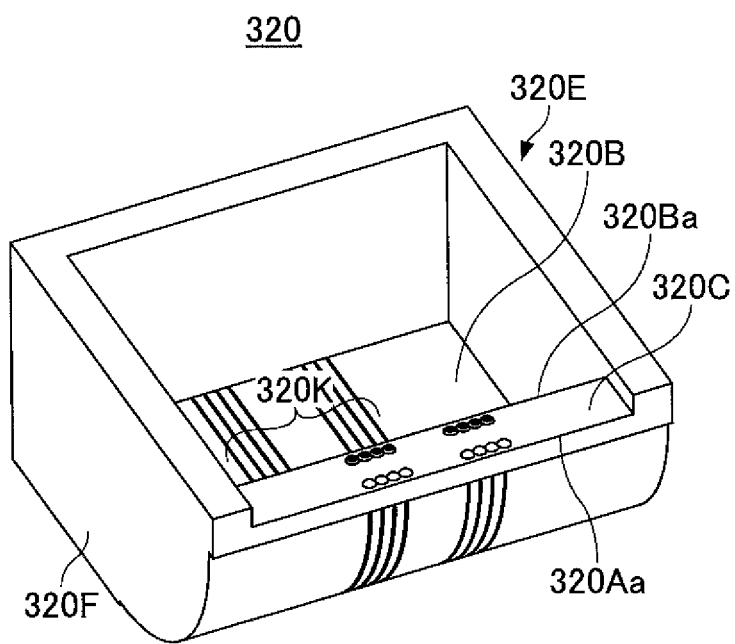
FIG. 12 is a perspective view of the optical deflection member on the side opposite to the side illustrated in FIG. 11A according to the third embodiment.

FIG. 11A is a perspective view of the optical deflection member 320, illustrating its exterior configuration. FIG. 11B is a cross-sectional view of the optical deflection member 320. FIG. 12 is a perspective view of the optical deflection member 320 on the side opposite to the side illustrated in FIG. 11A. The optical deflection member 320 is formed of, for example, an olefin resin.

The optical deflection member 320 includes an exterior surface 320A that curves (outward) to have a convex shape; an interior surface 320B that curves (inward) to have a concave shape; a first plane part (a bottom surface part) 320C including a first end straight line 320Aa of the exterior surface 320A and an end straight line 320Ba of the interior surface 320B; a second plane part (a rear surface part) 320D including a second end straight line 320Ab of the exterior surface 320A; and side surfaces 320E and 320F.

The exterior surface 320A and the interior surface 320B of the optical deflection member 320 have a shape of, for example, a combination of a plane and a side (circumferential) surface of a cylinder. The first plane part 320C and the second plane part 320D form an angle of substantially 90 degrees.

Further, the exterior surface 320A and the interior surface 320B of the optical deflection member 320 are formed so that their respective cross sections have a shape of, for example, a succession of a straight line and an arc. However, the cross-sectional shape of the exterior surface 320A and the interior surface 320B is not limited to this, and may be any shape as long as the shape is so smooth as to not prevent passage of optical signals. For example, the cross-sectional shape of the exterior surface 320A and the interior surface 320B may be any shape formed of a straight line, a parabola, an ellipse, a hyperbola, or any combination of them.

An array of optical waveguides (an optical waveguide array) 320G is formed on the exterior surface 320A of the optical deflection member 320. (Referring to FIG. 11A, eight optical waveguides are arranged in an array as the optical waveguide array 320G.) The optical waveguides are formed by, for example, filling grooves formed on the exterior surface 320A with a desired core material having a light transmission characteristic and stacking a desired resin coating layer on the core layer to cover the core layer.

Further, an array of optical waveguides (an optical waveguide array) 320K is formed on the interior surface 320B of the optical deflection member 320. (Referring to FIG. 12, eight optical waveguides are arranged in an array as the optical waveguide array 320K.) The optical waveguides are formed by, for example, filling grooves formed on the interior surface 320B with a desired core material having a light transmission characteristic and stacking a desired resin coating layer on the core layer to cover the core layer.

The optical deflection member 320 is attached to the internal board 330 using an adhesive agent, screws or the like so that the first plane part 320C faces the light-receiving device 332 and the light-emitting device 334. A lens for improving the characteristics of the optical system may be provided between the optical deflection member 320 and the light-receiving device 332 and/or the light-emitting device 334.

Further, the optical-module-side MPO connector 310 is attached to the optical deflection member 320 so that the second plane part 320D faces the optical-module-side MPO connector 310.

This configuration allows the optical deflection member 320 to deflect an optical signal input from the optical cable 5 substantially 90 degrees and then output the optical signal to the light-receiving device 332, and to deflect an optical signal input from the light-emitting device 334 substantially 90 degrees and then output the optical signal to the optical cable 5.

Further, the optical deflection member 320 has an array of optical waveguides formed on each of the exterior surface 320A and the interior surface 320B. Therefore, the optical deflection member 320 has multiple optical waveguides arranged in two arrays (in two tiers) on the outer side. (See FIG. 12.) This makes it possible to adapt to an MPG connector having multiple optical signal input/output parts arranged in two arrays, not to mention an optical fiber containing multiple optical waveguides (optical fibers) arranged in two arrays.

The internal board 330 is, for example, a flat-plate board having copper interconnects or the like formed on a glass epoxy resin substrate. The light-receiving device 332 and the light-emitting device 334 are attached on one side of the internal board 330, and the driver 340, the thermally conductive sheet 342, and the radiator fin 344 are stacked in layers on the other side of the internal board 330. The driver 340 and the light-emitting device 334 are connected by forming vias and connecting the light-emitting device 334 and pads provided around the lead-out parts of the vias by wire bonding. This makes it possible to dispose elements with efficiency without an excessive increase in the size of the internal board 330.

The light-receiving device 332, which is a photoelectric conversion element, is configured to convert an optical signal input from the optical fiber 5 through the MPO connectors 6 and 310 and the optical deflection member 320 into an electrical signal and to output the electrical signal. The electrical signal output by the light-receiving device 332 is output to the external board 1 via the right angle connector 2.

The driver 340 is configured to cause an electrical signal input from the external board 1 via the right angle connector 2 to be converted into an optical signal and output by the light-emitting device 334. Further, the driver 340 may also be configured to perform processing such as amplification and filtering on the electrical signal output by the light-receiving device 332.

This configuration allows an optical signal input from the optical cable 5 to be converted into an electrical signal and output to the external board 1 and allows an electrical signal input from the external board 1 to be converted into an optical signal and output to the optical cable 5.

Further, a direction in which the optical cable 5 is introduced is substantially parallel to the plane part (flat surface) of the internal board 330 on which the light-receiving device 332 and the light-emitting device 334 are attached, and the internal board 330 and the external board 1 are connected with the right angle connector 2 as illustrated in FIG. 10. Accordingly, it is possible to make the introduction direction of the optical cable 5 substantially parallel to the plane part of the external board 1. (These are along the Y-axis directions in FIG. 10.)

This allows the optical module connector 300 to be inserted, at the end of the external board 1, from a direction parallel to the plane part of the external board 1, so that the direction of cable connection is preferable. For example, it is assumed that the external board 1 is part of a microcomputer. Usually, connection terminals in desktop personal computers or notebook personal computers are so designed as to allow a cable to be connected to a housing having a flat-plate shape from a direction parallel to the plane part of the housing. The optical module connector 300 of this embodiment is suitably adaptable to such a form of connection.

It is possible for the above-described optical deflection member 320 according to this embodiment to deflect an optical signal input from the optical cable 5 substantially 90 degrees and output the optical signal to the light-receiving device 332 and to deflect an optical signal input from the light-emitting device 334 substantially 90 degrees and output the optical signal to the optical cable 5 while having multiple optical waveguides arranged in two arrays (in two tiers).

Further, according to the optical module connector 300 of this embodiment and an optical module that forms part of the optical module connector 300, use of the optical deflection member 320 makes it possible to achieve a desired positional relationship between the optical cable 5 and the internal board 330 and the external board 1 (the introduction direction of the optical cable 5 and the plane parts of the internal board 330 and the external board 1 being substantially parallel) while having a structure where multiple optical waveguides are arranged in two arrays (in two tiers).

The present invention is not limited to the embodiments disclosed above, and variations and modifications may be made without departing from the scope of the present invention.

For example, the following configurations may be employed to achieve such a positional relationship as to cause multiple optical waveguides to be arranged in two arrays (in two tiers) and to cause the introduction direction of the optical cable 5 to be parallel to the plane part of the external board 1.

Figure 13:
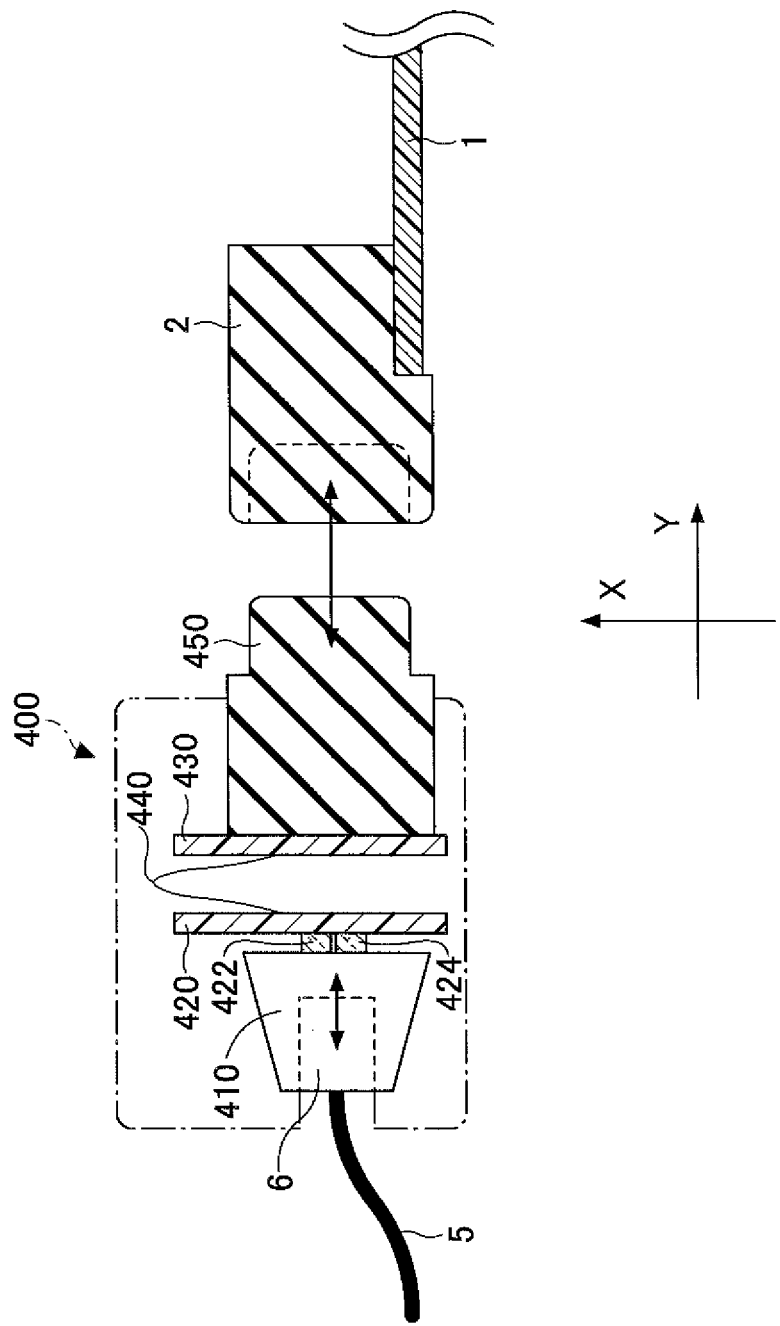
FIG. 13 is a cross-sectional view of an optical module connector according to a fourth embodiment of the present invention, illustrating an overall configuration of the optical module connector.

FIG. 13 is a cross-sectional view of an optical module connector 400 according to a fourth embodiment of the present invention, illustrating an overall configuration of the optical module connector 400.

The optical module connector 400 includes an optical-module-side MPO connector 410, a first internal board 420, a light-receiving device 422, a light-emitting device 424, a second internal board 430, a flexible cable 440, and an optical-module-side right angle connector 450. The driver described in the above-described embodiments may be attached on either side of the first internal board 420, for example. Further, the flexible cable 440 contains multiple optical waveguides arranged in two arrays (in two tiers) as illustrated in FIG. 2 by way of example.

According to this configuration as well, it is possible to achieve a desired positional relationship between the optical cable 5 and the external board 1 (the introduction direction of the optical cable 5 and the plane part of the external board 1 being substantially parallel) while having a structure where multiple optical waveguides are arranged in two arrays (in two tiers).

Figure 14:
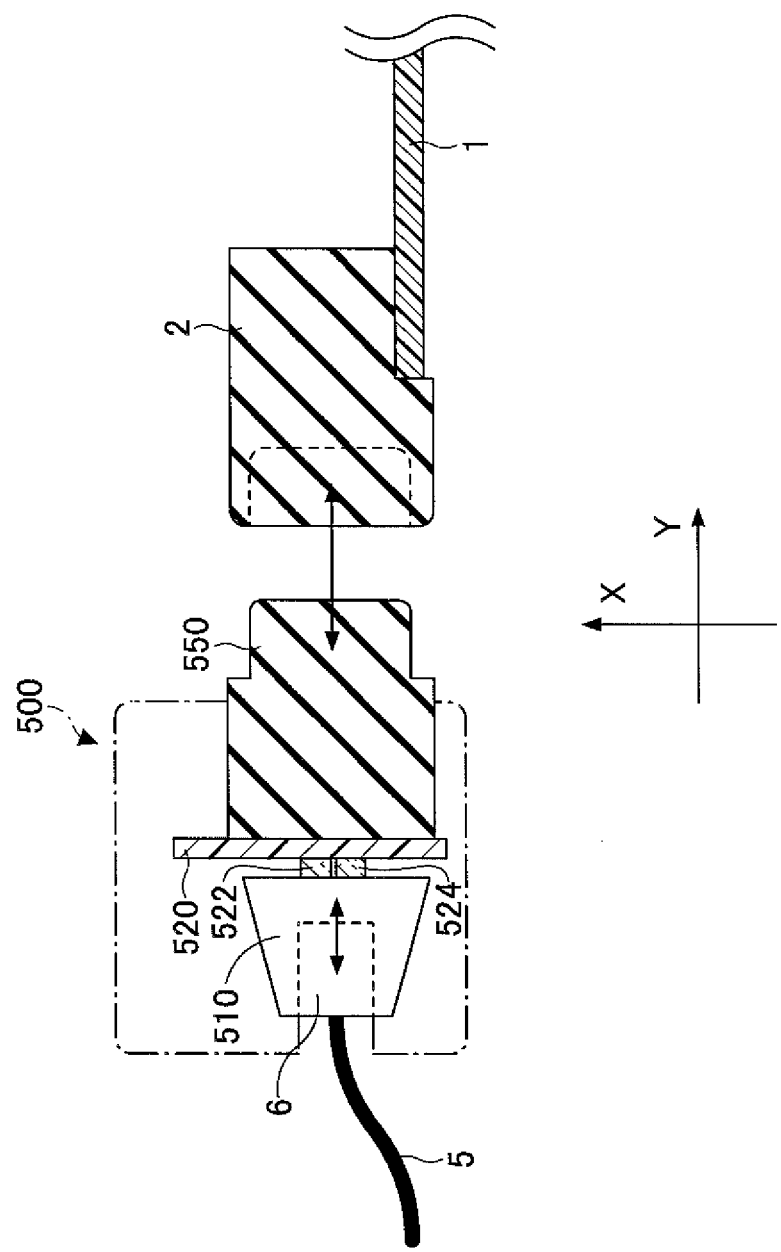
FIG. 14 is a cross-sectional view of an optical module connector according to a fifth embodiment of the present invention, illustrating an overall configuration of the optical module connector.

Further, FIG. 14 is a cross-sectional view of an optical module connector 500 according to a fifth embodiment of the present invention, illustrating an overall configuration of the optical module connector 500.

The optical module connector 500 includes an optical-module-side MPO connector 510, an internal board 520, a light-receiving device 522, a light-emitting device 524, and an optical-module-side right angle connector 550. The driver described in the above-described embodiments may be attached on the surface of the internal board 520 on which the light-receiving device 522 and the light-emitting device 524 are attached, for example.

According to this configuration as well, it is possible to achieve a desired positional relationship between the optical cable 5 and the external board 1 (the introduction direction of the optical cable 5 and the plane part of the external board 1 being substantially parallel) while having a structure where multiple optical waveguides are arranged in two arrays (in two tiers) (inside the optical-module-side MPO connector 510).

Embodiments of the present invention may be applied to the manufacturing industry of connecting devices applicable to optical communication.

According to an aspect of the invention, an optical module may have a structure where multiple optical waveguides are arranged in two arrays (in two tiers), and achieve a desired positional relationship between an optical cable to be connected and an internal board.

According to an aspect of the invention, an optical module connector may have a structure where multiple optical waveguides are arranged in two arrays (in two tiers), and achieve a desired positional relationship between an optical cable to be connected and an internal board and an external board to fit (connect) to.

According to an aspect of the invention, an optical deflection member may have a structure where multiple optical waveguides are arranged in two arrays (in two tiers), and deflect an optical signal input at a first plane part or a second plane part substantially 90 degrees and output the optical signal to the second plane part or the first plane part.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. An optical module configured to perform conversion between an optical signal and an electrical signal, comprising:
    a board having a flat-plate shape;
    a light-receiving part and a light-emitting part attached on a surface of the board, the light-receiving part being configured to receive a first optical signal input from an optical cable and the light-emitting part being configured to output a second optical signal based on an input electrical signal; and
    an optical deflection member configured to deflect the first optical signal substantially 90 degrees and output the first optical signal to the light-receiving part and to deflect the second optical signal input from the light-emitting part substantially 90 degrees and output the second optical signal to the optical cable, the optical deflection member including a plurality of optical waveguides arranged in a first array and a second array, wherein the first array is positioned outside the second array with reference to the board.

2. The optical module as claimed in claim 1, wherein the optical deflection member includes
    an exterior member including
        an exterior surface curved to have a convex shape, along which the first array of the optical waveguides is formed;
        an interior surface curved to have a concave shape;
        a first plane in which first end portions of the optical waveguides of the first array are arranged so as to face the light-receiving part ant the light-emitting part; and
        a second plane in which second end portions of the optical waveguides of the first array are arranged so as to face a connecting part configured to connect to the optical cable, the second plane being at an angle of substantially 90 degrees to the first plane; and an interior member including
an exterior surface so curved to have a convex shape as to face the interior surface of the exterior member, along which the second array of the optical; waveguides is formed.

3. The optical module as claimed in claim 1, wherein the optical deflection member includes
an exterior member including
an interior surface curved to have a concave shape, along which the first array of the optical waveguides is formed;
a first plane in which first end portions of the optical waveguides of the first array are arranged so as to face the light-receiving part and the light-emitting part; and
a second plane in which second end portions of the optical waveguides of the first array are arranged so as to face a connecting part configured to connect to the optical cable and being at an angle of substantially 90 degrees to the first plane part; and
an interior member including
an exterior surface so curved to have a convex shape as to face the interior surface of the exterior member, along which the second array of the optical waveguides is formed.

4. The optical module as claimed in claim 1, wherein the optical deflection member includes
an exterior surface curved to have a convex shape; along which the first array of the optical waveguides is formed;
an interior surface curved to have a concave shape; along which the second array of the optical waveguides is formed;
a first plane in which first end portions of the optical waveguides of the first array and the second array are arranged so as to face the light-receiving part and the light-emitting part; and
a second plane plane in which second end portions of the optical waveguides of the first array and the second array are arranged so as to face a connecting part configured to connect to the optical cable and being at an angle of substantially 90 degrees to the first plane.

5. The optical module as claimed in claim 1, further comprising:
a driver configured to control the light-emitting part; and
a radiator fin,
wherein the driver and the radiator fin are attached on a surface of the board facing away from the surface thereof on which the light-receiving part and the light-emitting part are attached.

6. An optical module connector, comprising:
the optical module as set forth in claim 1; and
a connector configured to connect the optical module to an external board,
wherein a direction in which the optical cable is introduced is substantially parallel to a plane part of the board and a plane part of the external board with the optical module connector being fit to the external board with the connector.

7. A member for optical deflection, comprising:
an exterior member including an exterior surface curved to have a convex shape; an interior surface curved to have a concave shape; a first plane part including a first end straight line of the exterior surface and a first end straight line of the interior surface; and a second plane part including a second end straight line of the exterior surface and a second end straight line of the interior surface, the second plane part being at an angle of substantially 90 degrees to the first plane part; and
an interior member including an exterior surface so curved to have a convex shape as to face the interior surface of the exterior member,
wherein a first array of optical waveguides is formed along the exterior surface of the exterior member, and a second array of optical waveguides is formed along the exterior surface of the interior member, and
an optical signal input at a first one of the first plane part and the second plane part of the exterior member is deflected substantially 90 degrees to be output to a second one of the first plane part and the second plane part of the exterior member.

8. A member for optical deflection, comprising:
an exterior member including an interior surface curved to have a concave shape; a first plane part including a first end straight line of the interior surface; and a second plane part including a second end straight line of the interior surface, the second plane part being at an angle of substantially 90 degrees to the first plane part; and
an interior member including an exterior surface so curved to have a convex shape as to face the interior surface of the exterior member,
wherein a first array of optical waveguides is formed along the interior surface of the exterior member, and a second array of optical waveguides is formed along the exterior surface of the interior member, and
an optical signal input at a first one of the first plane part and the second plane part of the exterior member is deflected substantially 90 degrees to be output to a second one of the first plane part and the second plane part of the exterior member.

9. A member for optical deflection, comprising:
an exterior surface curved to have a convex shape;
an interior surface curved to have a concave shape;
a first plane part including a first end straight line of the exterior surface and an end straight line of the interior surface; and
a second plane part including a second end straight line of the exterior surface, the second plane part being at an angle of substantially 90 degrees to the first plane part,
wherein an array of optical waveguides is formed along each of the exterior surface and the interior surface, and
a first optical signal input at the first plane part is deflected substantially 90 degrees to be output to the second plane part, and a second optical signal input at the second plane part is deflected substantially 90 degrees to be output to the first plane part.

* * * * *